United States Patent [19]

Stevenson

[11] 3,977,429
[45] Aug. 31, 1976

[54] HOSE REEL ASSEMBLY

[76] Inventor: James S. Stevenson, 4230 St. Andrew Road, Oakland, Calif. 94605

[22] Filed: Oct. 10, 1974

[21] Appl. No.: 513,867

Related U.S. Application Data

[62] Division of Ser. No. 315,295, Dec. 15, 1972, Pat. No. 3,856,274.

[52] U.S. Cl............................ 137/355.27; 242/86; 242/77.4; 72/83
[51] Int. Cl.².......................................... B65H 75/34
[58] Field of Search................. 137/355.12, 355.16, 137/355.2, 355.26, 355.27; 242/77.4, 86, 118.8; 72/83

[56] References Cited
UNITED STATES PATENTS

| | | | |
|---|---|---|---|
| 1,836,921 | 12/1931 | Harrison | 72/83 |
| 2,301,208 | 11/1942 | Gear | 137/355.2 X |
| 3,011,201 | 12/1961 | Cymara | 137/355.26 X |
| 3,433,247 | 3/1969 | Haselden | 137/355.26 |

FOREIGN PATENTS OR APPLICATIONS

| | | | |
|---|---|---|---|
| 157,987 | 1/1953 | Australia | 137/355.20 |
| 670,717 | 4/1952 | United Kingdom | 242/86 |

Primary Examiner—Henry T. Klinksiek

[57] ABSTRACT

Spray equipment of lightweight primarily adapted for mobile installation and including means for mixing spray solution during spraying and in response to flow of water into a spray tank. The equipment features a lightweight spray tank, mixing device, and novel hose reel features.

1 Claim, 17 Drawing Figures

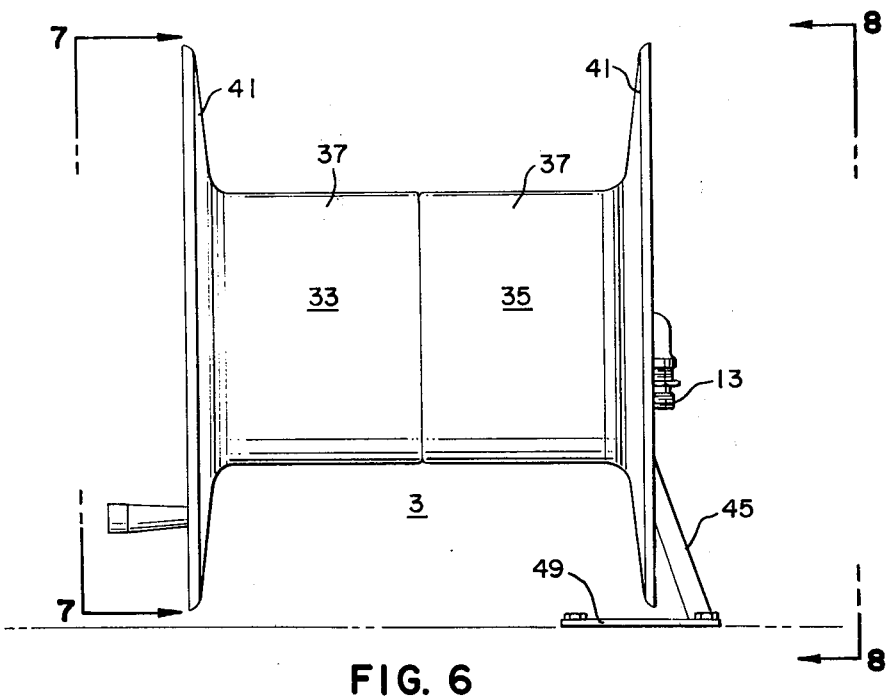
FIG. 6
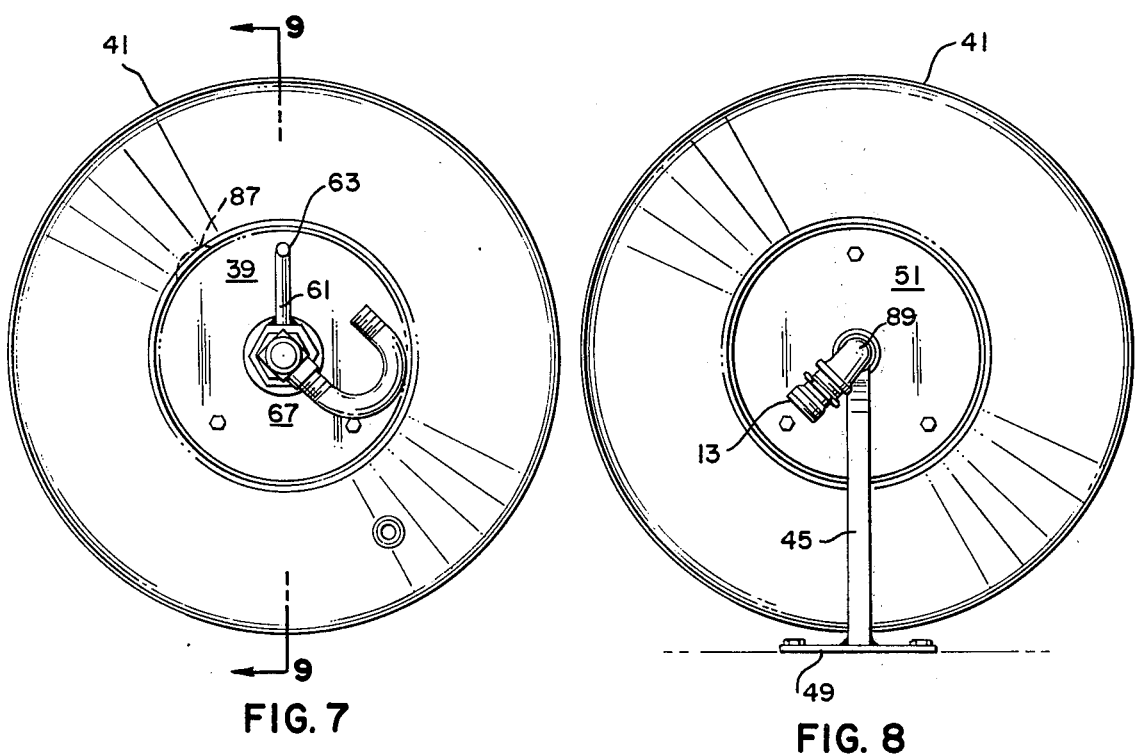
FIG. 7
FIG. 8

HOSE REEL ASSEMBLY

This is a division of application Ser. No. 315,295, filed Dec. 15, 1972, Now U.S. Pat. No. 3,856,274.

My invention relates to spray equipment primarily for the spraying of insecticides and the like, and method of spraying, and more particularly as relates to a system assembly and components, primarily for truck installation.

Truck installations of spray equipment for such purpose are broadly not new. However, the component parts of such equipment are cumbersome and heavy, and when installed as a system in a mobile unit such as a truck, the system may weigh several hundred pounds, and due to the cumbersome of such components, a truck installation occupies most of the available space, leaving little if any space for anything else.

Aside from this, the excessive weight of prior available installations manifest in the added cost of transportation and operation, both of which are continuing factors and therefor important from an economic standpoint.

Among the objects of my invention are;

1. To provide a novel and improved spray equipment assembly which lends itself to a light weight and compact installation for trucks or other type of mobile apparatus;

2. To provide a novel and improved spray equipment assembly of such light weight and compactness as to enable installation in small light weight trucks and other mobile equipment, and with room to spare;

3. To provide a spray equipment assembly involving novel and improved compatible components of light weight and embodying novel features;

4. To provide a novel and improved hose reel assembly of light weight and substantial hose capacity;

5. To provide a novel and improved hose reel assembly having brake means holding the reel against rotation, when rotation is not desired.

6. To provide a novel and improved means in spray equipment for mixing a pesticide or the like with water in measured quantity to form a solution of desired concentration;

7. To provide a novel and improved mixing means for spray equipment or the like, which meters a small volume component in accordance with flow of a larger volume component with which it is to be mixed;

8. To provide a novel and improved solution storage tank which is admirably adapted for a mobile installation of spray equipment;

9. To provide a novel and improved solution storage tank of simple and extremely light weight construction;

10. To provide a novel and improved method of formulating a spray solution to relate its preparation to its use.

Additional objects of my invention will be brought out in the following description of a preferred embodiment of the same, taken in conjunction with the accompanying drawings wherein;

FIG. 6 is a view taken in the plane 6—6 of FIG. 1;

FIG. 7 is a view taken in the plane 7—7 of FIG. 6;

FIG. 8 is a view taken in the plane 8—8 of FIG. 6;

Figure 1:
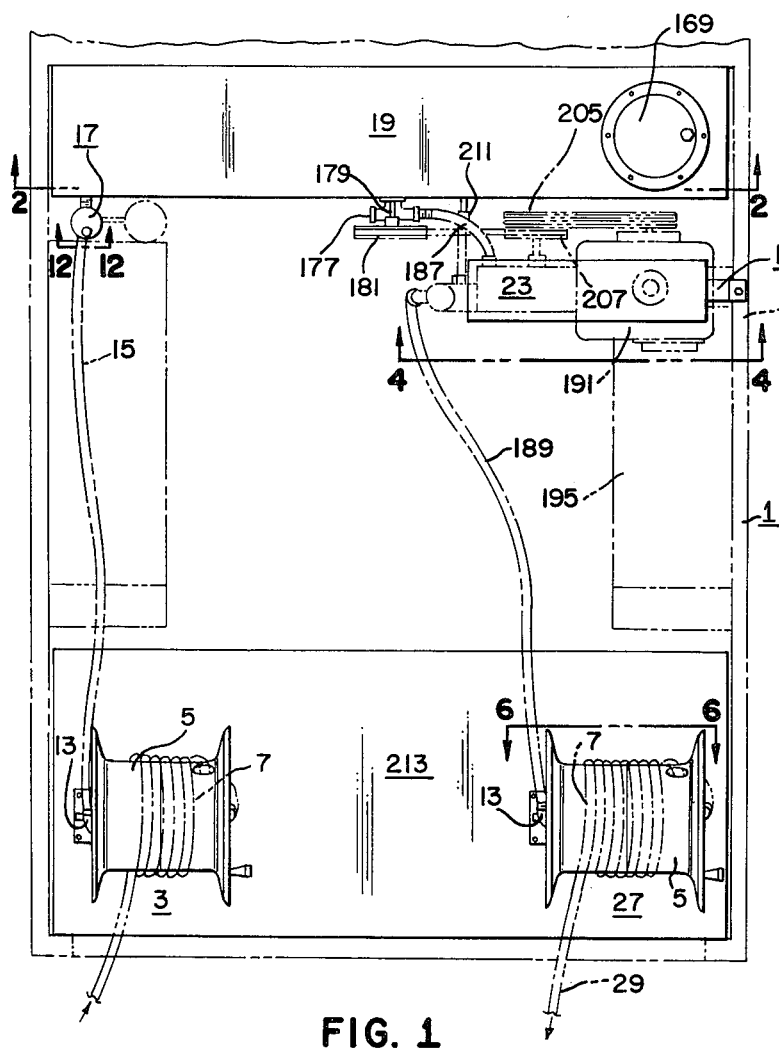
FIG. 1 is a plan view of my improved spray equipment assembly as installed in a small truck or more comparable mobile unit.
Figure 4:
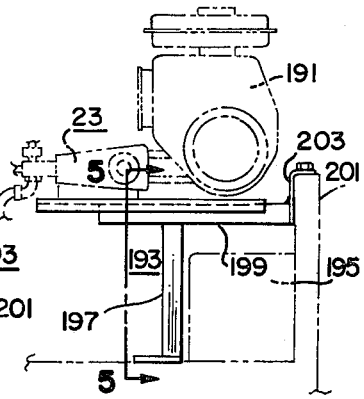
FIG. 4 is a view taken in the plane 4—4 of FIG. 1.
Figure 5:
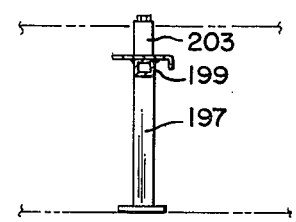
FIG. 5 is a view taken in the plane 5—5 of FIG. 4.
Figure 2:
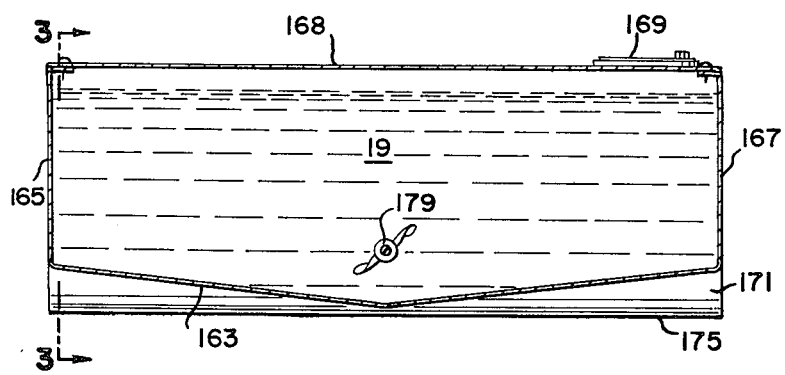
FIG. 2 is a view in section, taken in the plane 2—2 of FIG. 1.
Figure 3:
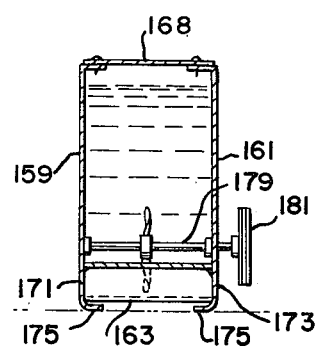
FIG. 3 is a view in section, taken in the plane 3—3 of FIG. 2.
Figure 9:
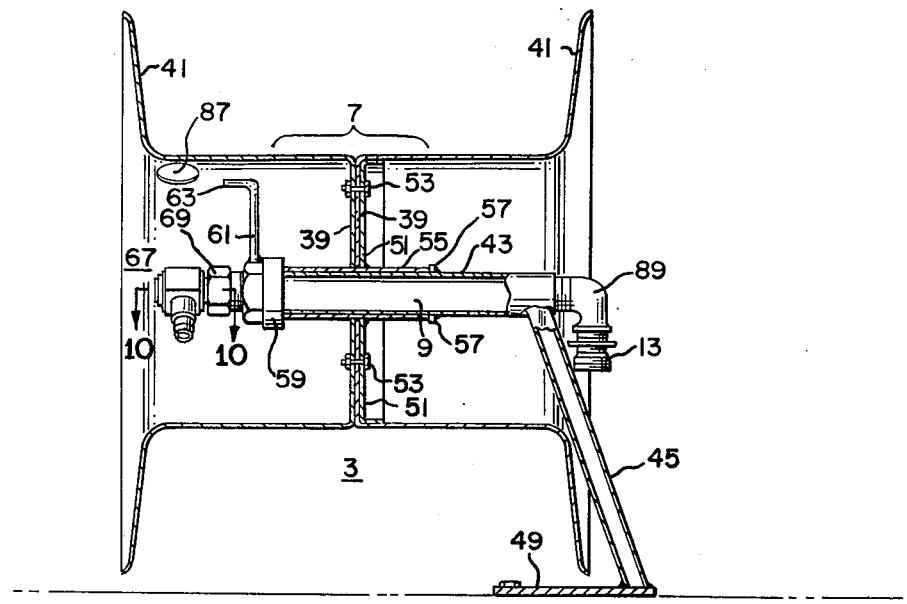
FIG. 9 is a view taken in the plane 9—9 of FIG. 7.
Figure 10:
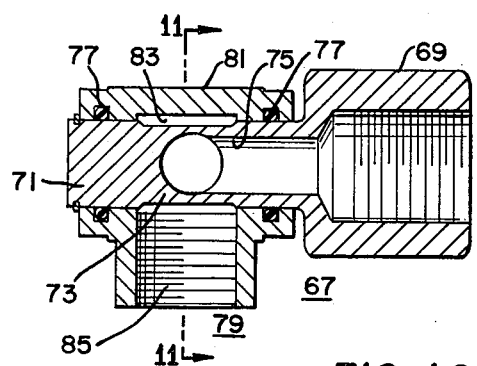
FIG. 10 is a view in section, taken in the plane 10—10 of FIG. 9.
Figure 11:
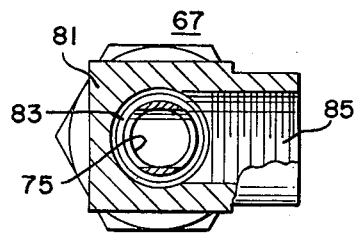
FIG. 11 is a view in section, taken in the plane 11—11 of FIG. 10.
Figure 13:
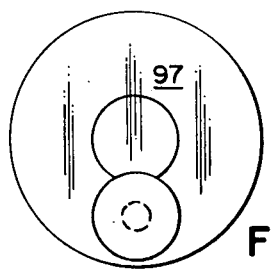
FIG. 13 is a plan view looking at the upper end of the device of FIG. 2.
Figure 16:
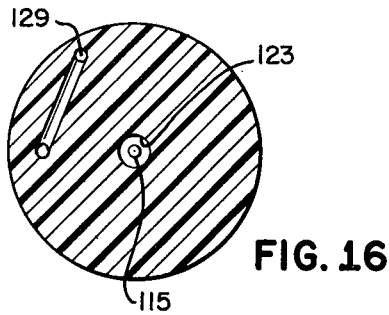
FIG. 16 is a view in section taken in the plane 16—16 of FIG. 15.
Figure 12:
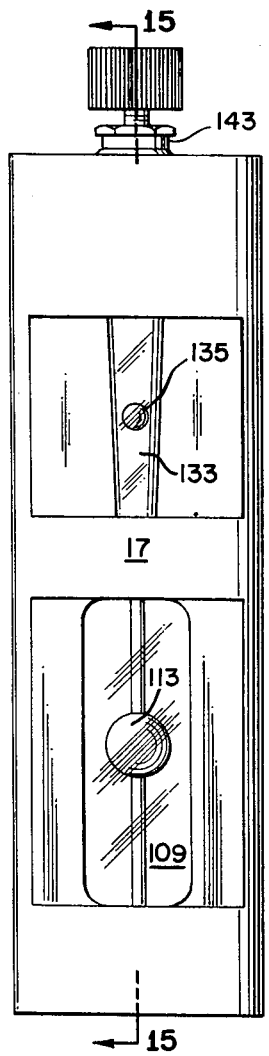
FIG. 12 is a view taken in the plane 12—12 of FIG. 1.
Figure 15:
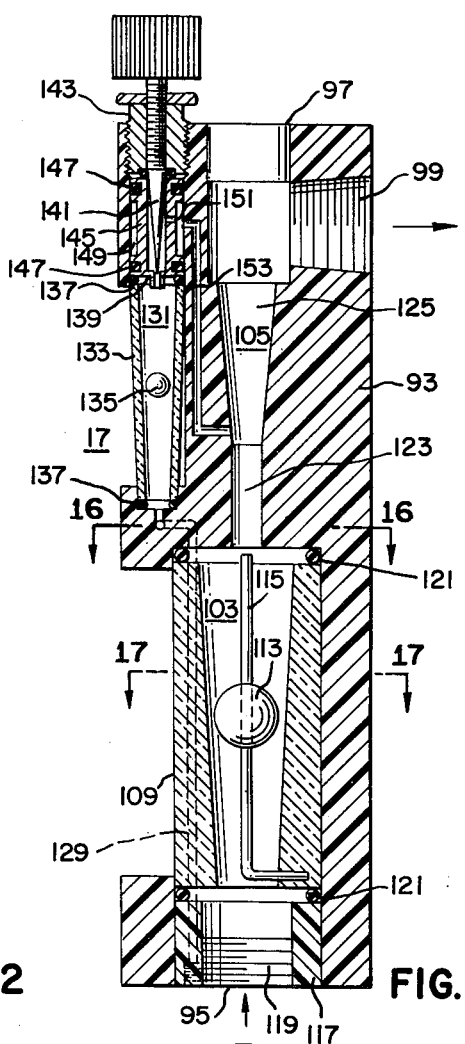
FIG. 15 is a view in section taken in the plane 15—15 of FIG. 12.
Figure 14:
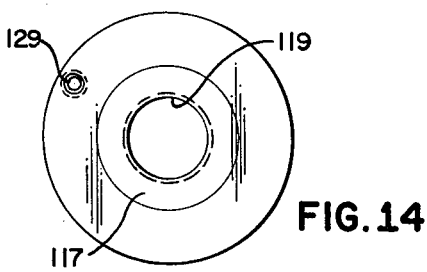
FIG. 14 is a plan view looking at the underside of the device of FIG. 12.
Figure 17:
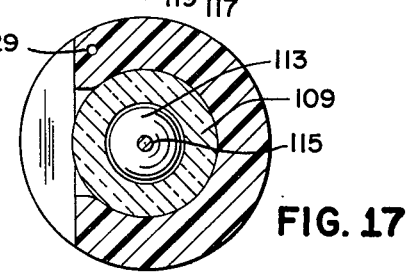
FIG. 17 is a view in section taken in the plane 17—17 of FIG. 15.

Referring to the drawings for details of my invention in its preferred form, the spray equipment assembly has been illustrated in FIG. 1 as installed in a small truck compartment 1 or comparable mobile unit, involving in general a hosereel assembly 3 installed at one rear corner of the truck compartment, said assembly including a reel 5 having a hose 7 installed thereon, with one end coupled to an axial shaft passageway 9 (FIG. 9), leaving the opposite end of the hose free for connection to some external source of water supply.

At the opposite end of said hollow axial passageway, is a hose coupling fitting 13 for connection of a hose 15 from this point to a chemical ratio mixing device 17, the output of which connects to a storage tank 19 disposed transversely of the truck compartment adjacent the cab end thereof.

This tank is connected to the suction line of a pump 23, which in turn discharges to the hose fitting 13 at the end of a hollow shaft passageway 9 of a hose reel assembly 27 similar to that previously described. A hose 29 stored on this hose reel assembly is flow coupled at the opposite end of this axial hollow passage with its other end free for discharge.

The hose reel assembly 3 and 27, each is made up of a pair of bell shaped components 33, 35 each comprising a cylindrical section 37 terminating at one end in a base 39 and at its other end in an outwardly directed flange 41, and formed from a disc of metal, preferably sheet aluminum, on a lathe with the use of suitable forming tools.

These bell shaped components are joined base to base to form the spool or reel 7. This reel is rotatably mounted on a fixed hollow shaft 43 which is horizontally supported at one end only, on the end of a bracket arm 45, the other end of which is welded or otherwise affixed to a mounting plate 49.

In rotatably mounting the reel to this stationary hollow shaft, a shallow dish shaped disc 51 is nestled into the bottom of one of the bell shaped components and anchored into position with the bases at the time of joining the two components base to base, which can be accomplished through the use of a plurality of bolts 53. A sleeve 55 rotatably mounted on the fixed hollow shaft and passing through the dish shaped disc and connected bases, is connected thereto as by welding, whereby the reel may freely rotate about the fixed hollow shaft.

The reel is restricted as to its position on the hollow shaft by suitable stops 57 welded to the fixed hollow shaft adjacent one end of the sleeve, while at its other end, the sleeve faces a thrust bearing 59 which is threaded onto the hollow shaft and sufficiently close to the sleeve as to render the thrust bearing capable of being threaded into pressure engagement with the proximate end of the sleeve when desired, to inhibit rotation of the reel, or being backed off sufficiently to permit free rotation of the reel.

To effect such tightening or loosening of the thrust bearing, a radial arm 61 extends from the thrust bearing and is provided with a hand grip 63 at its remote end, to enable manually rotation of the thrust bearing in whichever direction desired.

The threaded end of the hollow shaft extends through the thrust bearing and beyond, and to this end is affixed a swivel assembly 67 involving a nut 69 threaded to the end of the hollow shaft and having an axial extension 71 formed with a reduced intermediate portion 73 and having an axial bore 75 terminating in the region of the intermediate section of reduced outside diameter.

About this extension is rotatably sealed, as by spaced O-rings 77, a swivel hose fitting 79 having an enlarged intermediate portion 81 registering with the reduced intermediate portion 73 of the extension to provide a circumferential passage 83 flow connecting with an internally threaded discharge opening 85 adapted for receiving a threaded end of a hose.

One end of such a hose is adapted to pass through an opening 87 in the proximate end of the reel, such hose being then adapted for storage on the reel in the conventional manner.

At the bracket supporting end of the fixed shaft, is connected an elbow 89 to which the hose fitting 13 is connected.

The hose reel as thus described, being constructed primarily of light weight sheet aluminum will, overall, be of very light weight, yet, by reason of its method of construction and assembly, will be very rugged and durable. In addition, the braking feature incorporated into the hose reel construction, provides a very simple and convenient way of locking the hose reel when it becomes desirable to do so, and by simple operation of backing off the thrust bearing, the reel becomes free of such restraint and capable of running free with a minimum of friction.

The ratio mixing device 17 is formed preferably from a substantially cylindrical block 93 of any suitable material as aluminum and is provided with a substantially axial passageway from its input end 95 to a point adjacent its opposite end 97 where it is flow coupled through a fitting connection opening 99 to the storage tank 19. This axial passage includes a flow rate indicator 103 and a venturi 105 and provides a flow passage for the larger volume ingredient of the spray mixture to be formed. In the majority of instances, such major volume ingredient will be water.

The flow rate indicator comprises a transparent tube 109 installed adjacent the input end of the device, the tube having an expanding passage with its larger end adjacent the input end to the venturi. A ball indicator 113 of somewhat greater gravity than the water or other liquid to flow through this passage, is adapted to be lifted in accordance with flow rate of such liquid, and thus, with proper calibration on the transparent tube, the position of the ball will indicate the flow rate of liquid through the passageway.

To confine movement of the ball to a specified path and thereby facilitate readings, the ball is slidably mounted on an axially positioned stem 115 which is anchored at its lower end by a right angle bend to the wall of the tube. Readings on a scale provided on the glass tube are made possible by removing sufficient of the cylinder wall of the device to expose an adequate portion of the transparent tube, which exposed portion then functions as a window.

The tube is installed by inserting it axially into a cylindrical chamber formed in the cylinder block 93 and retained therein by a cylindrical block 93 and retained therein by a cylindrical plug 117 having an interior threaded passage 119 for connection of a fitting or a hose coupling. A suitable O-ring 12, at each end of the transparent tube, will function as seals at these points. The venturi 105 forming part of the main passageway, includes a cylindrical portion 123 and an upwardly flaring portion 125, at the junction of which, a region of reduced pressure results from the flow of liquid therethrough, the degree of reduction of pressure being a function of the flow rate of liquid therethrough. This pressure, being lower than atmosphere pressure, can be utilized to draw in liquid which is at atmospheric pressure, and the rate at which such liquid will be drawn in, will be a function of the difference in pressure between atmospheric pressure and the lower pressure in the venturi, with the frictional resistance of the flow path of such liquid to the venturi taken into account.

To provide for such intake of liquid, a passageway 129 of considerably smaller diameter than the main flow passage has its intake end at the lower end of the housing and extends upwardly to flow connect with a flow rate indicator 131 of substantially smaller diameter than that in the main flow passageway. This flow indicator is in much the same manner as the other, but through the upper end of the housing, and involves an upwardly flaring transparent tube 133 presenting a much narrower passageway than the corresponding tube in the main flow passageway, and like the other flow rate indicator, contains a ball 135 of somewaht greater specific gravity than the liquid to flow therethrough. Because of the narrower passage provided by the tube of this flow rate indicator, a guide stem is not esstential. To render the ball visible, a section of the housing is removed sufficiently to expose a longitudinal portion of the tube to view, and this exposed portion may be calibrated if desired or provided with suitable markings to indicate a prevailing flow rate liquid therethrough. An O-ring 137 at each end will serve to seal the passageway at these points as in the other flow indicator.

At the upper end of the tube and bearing against the proximate O-ring, is a valve seat 139 for an adjustable needle valve 141 which is adjustably threaded in a plug 143 installed in the upper end of the block, this plug being separated from the valve seat by a spacer 145 sealed at each end by an O-ring 147 and having an intermediate section of reduced outside diameter to provide a circumferential chamber 149 thereabout and which is connected to the region around the needle valve by a perforation 151 through the wall of this spacer. This circumferential chamber 149 is flow connected through a passageway 153 in the wall of the housing and leading to the main flow passageway at the low pressure region in the venturi.

The flow rate indicators will provide information which will enable one to determine the prevailing ration of volume of water or main flow ingredient to the ingredient which is being added thereto, and such ratio can be adjusted by adjustments of the needle valve.

Thus, with a source of water and an adequate supply of a spray chemical to be added thereto, the mixer will proportion the ingredients in accordance with a desired ratio and feed the same to the storage tank 19.

This storage tank is very simply fabricated of thin sheet metal or other suitable sheet material. It comprises a pair of opposing side walls 159, 161, and between the side walls is inserted a bottom 163 with upturned ends to form the end walls 165, 167, the inserted bottom and end walls being secured as by welding to the side walls. Both the side and end walls are preferably flanged inwardly at their upper ends to provide support for a cover 168, which may be removably fastened to the flanges by sheet metal screws.

A man-hole cover 169 provided in the top, enables access to the interior of the resulting tank, when removal of the cover is not necessary.

The bottom 163 is preferably trough shaped, that is sloping from each end wall down to a low point in the middle, and by installing the bottom above the lower edges of the side walls, the side wall portions below the bottom function as supporting legs 171, 173 for the tank which run the full length of the tank, and these are preferably turned under on an arc at their lower edges to form feet 175. By so arcing the feet, a spring or cushion effect results, and without concentration of stress which could bring about metal fatigue and possible cracking or fracturing of the legs.

A tank so constructed is of extremely light weight yet quite rugged, and one which can readily be fabricated from thin sheet metal.

Discharge from the tank can occur by way of a fitting 177 installed in a side wall thereof at the lowermost region of the trough.

Just above this discharge fitting, a shaft 179 passing through and journalled in a side wall is rotatably supported within the tank, and may be used to drive agitating vanes to maintain the spray solution in constant agitation. On the exposed end of this shaft is mounted a pulley 181 for belt driving the agitator.

Solution is pumped from the tank by the pump 23 by way of an intake hose suction line 187 flow connecting the tank discharge fitting to the suction end of the pump, and a discharge line 189 from the pump to the hose fitting of the remaining hose reel assembly 27 from where it will flow through the associated hose to a spray nozzle.

The pump driven by a suitable motor or engine 191 is supported above the floor of the truck adjacent to the spray tank, by a supporting bracket 193 straddling the approximate wheel well 195 of the truck, and involving a vertical section 197 flanged at its lower end for bolting to the floor of the truck body, and at its upper end supporting one end of a horizontal component 199 extending across the wheel well to the side wall or panel 201 of the truck body where this end is supported by an angle 203 welded at its lower end to the horizontal component and resting on the upper edge of the side wall or panel to which it is bolted. This simple support is not only rugged, but most of the weight of the pump and drive engine is carried by the vertical member 197 in comparison, while the entire supporting bracket tends to reinforce and brace the side wall or panel of the truck.

The drive engine 191 is belt coupled to a pulley 205 on the pump shaft. A second pulley 207 on this shaft is belt connected to the agitator pulley 181 whereby so long as the pump is functioning, the agitator will also be operating.

Connecting also to the intake side of the pump is an overflow connection 211 to the upper region of the spray tank, whereby in the event the tank for some reason, tends to overfill, the spray solution will drain to the pump and be pumped out with that taken from the lower region of the tank.

Inasmuch as the hose reel assemblies and storage tank are fabricated of sheet metal and therefore are quite light in weight and compact, the entire system occupies very little space, permitting the entire rear end of the truck body can be occupied by a storage box 213 fabricated of light weight sheet metal and such box may be utilized as a support for the hose reel assemblies, thereby rendering them readily accessible by an operator.

Aside from the various structural features of the system and its various components, the use of the mixer in the system, in the manner indicated, provides for considerable economy, not only from the view point of a savings in materials, but also from the viewpoint of considerable savings in both time and labor, a factor which might not be obvious from the above description of the system and its component parts.

In accordance with prior practice, an operator premixes his formulation, and since he hates to run out of spray before finishing the job contemplated, which would necessitate the formulation of an additional short batch, he will invariably overfill his tank, thereby leaving the operator with an excess amount remaining in the tank upon completion of the job, and this may run as high as fifty to one hundred gallons of spray solution.

Very frequently, an operator will want a small amount (usually under fifteen gallons) of a special mix to treat one tree or shrub suffering a special problem. Usually, when the basic job is done, the operator will add chemical to the spray remaining in the tank, or mix up a special batch to do the job. This necessitates estimating the desired amount of spray in a large metal box of uncertain dimensions, that is usually sitting far out of level, due to the vehicle being parked in a sloping driveway, so the operator is compelled to estimate how many ounces of chemical to add to such uncertain amount of solution remaining in his tank. Inasmuch as this involves considerable amount of guesswork, such information could invite financial as well as ecological disaster, and frequently results in damage to the tree or shrub being treated.

The operator, in addition, is frequently faced with the problem of how to handle solutions remaining in his tank following his completion of a job. He may spray the excess material out on the job without being paid for it, or follow the illegal procedure of dumping the excess solution into a gutter or sewer, or hope that he will be able to utilize some of it on the next job.

The present system which utilizes the mixing device, enables the operator to mix his solution as he utilizes it. Since the spraying procedure, itself, involves starts and stops, there is an average utilization of the spray solution from the tank, and the mixing device is so adjusted as to supply solution to the tank at a rate corresponding to such average use, or probably slightly in excess thereof. The operator, therefore, exercises a very close control over the amount of solution in his tank at any time, and experience dictates that, at the completion of the job, there should remain five to ten gallons of spray solution in the tank with which to start the next job.

This ability to control the formulation of the spray solution as it is being utilized, is entirely independent of tank orientation (whether it is on a level or not) and eliminates essentially all guesswork. It is estimated that in following past procedures, a 10 to 15% of chemical could be wasted or otherwise lost. Elimination of such waste, results in a savings of 10 to 15% in chemical cost alone, which could represent several thousands of dollars per year to a concern in this business.

The mixer, furthermore, offers the important advantage of eliminating guess work in the proportioning out of ingredients making up the spray solution. Once the ratio has been set, it will not vary materially despite fluctuations in the water supply since any such fluctuations will cause corresponding variations in the introduction of chemical.

Aside from the foregoing advantages attributable to the presence of the mixer in the system, the overall system installation permits of a considerable savings in labor, occasioned partly by the fact that it eliminates the necessity for manually formulating the spray solution and filling the tank before spraying, which operation takes on the order of 20 minutes for filling a 150 gallon tank. Then upon completion of a job, a period of the order of 15 minutes is required to stow all equipment, write up a bill and depart from the job site, and some require longer because, in lieu of hose reels, the hose is wound upon brackets.

The present system not only eliminates essentially the twenty minute period consumed in preparing the spray solution and filling the tank, but reduces the completion time involving the stowing of the equipment. With the use of power hose reels, a normal job time of 45 minutes following conventional procedures, can be cut to 16 minutes utilizing the system of the present invention. Accordingly, the resulting savings in time and labor can be considerable.

From the foregoing description of the invention in its preferred form, it will be apparent that the same is subject to alteration and modification without departing from the underlying principles involved, and I, accordingly, do not desire to be limited in my protection to the specific details illustrated and described, except as may be necessitated by the appended claims.

I claim:

1. A hose reel assembly comprising a reel including a pair of bell shaped components, each comprising a cylindrical section terminating at one end in a base and at its other end in a flange, and means joining said bell shaped components base to base, a reel supporting structure including a flow passageway extending axially of said base to base bell shaped components, means for rotatably supporting said reel on said supporting structure including a sleeve about said flow passageway rotatably supporting said base to base bell shaped components on said flow passageway, a hose coupling at one end of said passageway to permit of connection to a source of liquid, and a hose coupling at the opposite end of said flow passageway for connection of a hose, that bell-shaped component proximate to said latter hose coupling, having an opening through which such hose may pass for winding upon said hose reel, stop means on said flow passageway adjacent one end of said sleeve to help restrict said sleeve as to position on said flow passageway, and clutch means adjustably mounted on said flow passageway adjacent the opposite end of said sleeve to complete restriction of said sleeve and enable pressure engaging said sleeve between said clutch means and said stop means whereby to selectively inhibit rotation of said reel.

* * * * *